US 8,107,929 B2

(12) United States Patent
Citrin et al.

(10) Patent No.: US 8,107,929 B2
(45) Date of Patent: Jan. 31, 2012

(54) SYSTEM AND METHOD FOR RESPONDING TO INFORMATION REQUESTS FROM USERS OF PERSONAL COMMUNICATION DEVICES

(75) Inventors: Warren Citrin, Highland, MD (US); Eric Conn, Woodbine, MD (US)

(73) Assignee: Gloto Corporation, Folton, MD (US)

(*) Notice: Subject to any disclaimer, the term of this patent is extended or adjusted under 35 U.S.C. 154(b) by 856 days.

(21) Appl. No.: 11/752,709

(22) Filed: May 23, 2007

(65) Prior Publication Data
US 2008/0293387 A1 Nov. 27, 2008

(51) Int. Cl.
*H04W 4/00* (2009.01)
*H04M 3/42* (2006.01)

(52) U.S. Cl. ............... 455/414.1; 455/412.1; 455/456.3; 455/466; 725/32; 725/36; 725/40; 725/44; 725/47

(58) Field of Classification Search .... 455/414.1–414.4, 455/418, 456.5; 370/259–270; 379/157–158, 379/201–218; 348/21–22, 24, 383, 387.1, 348/390.1, 220
See application file for complete search history.

(56) References Cited

U.S. PATENT DOCUMENTS

| | | | | |
|---|---|---|---|---|
| 6,567,117 | B1* | 5/2003 | Nago et al. | 348/180 |
| 2006/0056796 | A1* | 3/2006 | Nishizawa et al. | 386/3 |
| 2007/0079383 | A1 | 4/2007 | Gopalakrishnan | |
| 2007/0088838 | A1 | 4/2007 | Levkovitz et al. | |
| 2007/0088852 | A1 | 4/2007 | Levkovitz | |
| 2008/0052414 | A1* | 2/2008 | Panigrahi et al. | 709/246 |

* cited by examiner

*Primary Examiner* — Charles Appiah
*Assistant Examiner* — Emem Stephen
(74) *Attorney, Agent, or Firm* — Johnson & Scaturro

(57) ABSTRACT

There are provided methods and systems for responding to information requests from users of personal communication devices, such as mobile telephones and more particularly cellular telephones. In one embodiment, information requests issued from a plurality of user's cellular telephones are received and processed at a central host site. Processing comprises parsing the user requests to determine the content and category type of the request and retrieving relevant content configured as a sequence of images (frames), referred to as a "video strip". When a user plays back a video strip on his or her personal communication device, the sequence of images appear on the user's display as a sequence of still images, played back at a slow rate, unlike conventional movie playback frame rates. When viewing a video strip, a viewer may stop, start, and pause the video strip. Pausing playback of a video strip enables the user to easily peruse the contents of each video strip frame.

35 Claims, 7 Drawing Sheets

SYSTEM AND METHOD FOR RESPONDING TO INFORMATION REQUESTS FROM USERS OF PERSONAL COMMUNICATION DEVICES

BACKGROUND

1. Field of the Invention

The present invention relates generally to the dissemination of information, and more particularly to a system and method for responding to information requests from users of personal communication devices.

2. Description of the Related Art

The modern cell phone is used for much more than voice communications. Millions of people around the world use cell phones as a means to talk with one another and to provide access to various sources of information. With a cellular telephone, users are able to use an incredible array of features and functions such as storing contact information, making to-do task lists, sending or receiving text, voice messages, graphical images, photographic images, recorded sounds, and even streaming media. Some cellular phones are also capable of receiving email messages forwarded from an email service, such that a user may check his or her email via the mobile phone.

Telecommunication concerns foresee a future wherein cellular services include handheld entertainment and data services as well as basic communications. Each facet has multiple business models; at least theoretically. Marketing professionals and advertisers see the mobile phone as the ultimate delivery vehicle for targeted advertising.

Despite its great potential, the wireless industry has been cautious about how to exploit the cellular phone. The highly personal and ever-present nature of the cell phone increases the potential to alienate customers with invasion of privacy concerns and unsolicited content. Although a wireless service provider may not be responsible for undesirable acts by marketers and third party product vendors, they are likely to take the brunt of the blame by their customers for any intrusions. Accordingly, carriers have placed prudent constraints on those who would undermine the carrier's relationships with their customers, intentionally or otherwise. In light of this sensitivity, the market has responded with ideas that do not violate the boundaries set by the carriers.

The wireless community, with its focus on minutes of use and data services, has made a substantial investment in network and handset developments that emphasize user-generated content, gaming, and customizations such as ring tones and video entertainment. SMS text messaging and MMS features for image and video capture now compliment traditional voice communications features on most new phones. Network support for cell phone internet services continues to evolve rapidly.

Marketing and advertising concepts are substantially less advanced when it comes to the mobile phone. For all of its obvious potential for intimate connection with the consumer, the potential to create a customer-adversary has never been greater. To mitigate the likelihood of adverse consumer reaction, mobile phone marketing methods are, by and large, opt-in schemes. The consumer must sign up to receive ads and, in most cases, they must be willing to download software onto their phone.

Voice and SMS services are the only proven mobile phone revenue models to date. A need, therefore, exists for a cell phone business paradigm that takes advantage of advanced handset features and the inherent personal relationship with the consumer, while avoiding the pitfalls of intrusion.

Most cell phones sold in the U.S. this year, over 100 million of them, will be photo and video capable. However, the majority of owners will use voice and SMS text capability exclusively. Despite consumers' desire to use advanced features, such as posting and printing pictures, watching mobile TV, and utilizing email and Internet services, most consumers do not know how to use anything other than the voice feature and, in rapidly increasing numbers, the text messaging features of their phones. Of those who use the camera feature already on their phones, the vast majority do not send the pictures from their phone to another phone or posting site. Cell phone pictures are typically shared face to face on the phone just as if they were on photo paper. This seems to be true even when the cost of sending is eliminated as a factor.

Likewise, an exceedingly small percentage of users will use the low resolution video feature to view video segments or make their own short videos and almost none will send them from the phone.

A similarly small number will pay to watch video clips or television on their phones. With the ubiquity of large-screen, flat panel TV's in every niche of our society, paying a sizable cost for clips to watch on a cell phone with limited battery life and poor visual quality is unlikely to become a national or global obsession within the bounds of current technology. Yet, without a significant market willing to buy TV and Internet data services for their cell phones, direct mobile marketing opportunities are limited. It is doubtful that a large number of consumers will choose to opt-in to advertising services just for the sake of receiving ads. If they did, it would run counter to the experiences of every other medium. Furthermore, "mobile life" experiments around the world have shown that there is presently no substantial demand to shop from one's cell phone or use the phone as a mobile equivalent to a laptop computer or television set.

There has, however, been behavioral evidence that certain types of information are readily consumed by the mobile user when the barriers to obtaining the information are low. Maps, weather, headlines and sports scores are among such items. But, after more than a decade of sponsor-supported free Internet computer content with no technical barriers to use, large numbers of consumers are unwilling to tackle the cost and technical obstacles associated with getting this type of information on their cell phones. Monthly subscriptions with multiple widget providers, wireless access protocol (WAP) sites with clumsy and difficult navigation, software downloads, slow transmission speeds, non-standard operating systems, and techno-phobia creates a challenging mobile environment.

The present invention overcomes the aforementioned financial, procedural and technical obstacles to allow mobile users to receive information in a manner that is attractive and readily accessible to the mobile user, advertisers and the wireless carrier communities.

SUMMARY

The present invention addresses these and other problems in the prior art by providing methods and systems that respond to information requests from users of personal communication devices, such as mobile telephones and more particularly cellular telephones.

In one embodiment, information requests issued from a plurality of user's cellular telephones are received and processed at a central host site. Processing comprises parsing the user requests to determine the content and category type of the request and retrieving relevant content configured as a sequence of images (frames), collectively referred to herein as a "video strip". When a user plays back a video strip on his or her personal communication device, the sequence of images appear on the user's display as a sequence of still images, where each image is displayed for approximately two seconds. However, each apparent still image is actually comprised of a sequence of underlying real image frames rendered within the context of a video or similar continuous format, such as 3gp or Flash™ having an actual frame rate on the order of twelve frames per second. The display frame rate of the apparent still images, which is on the order of one frame every two seconds, is novel in that it is unlike conventional movie playback frame rates which are typically on the order of 15-30 frames per second.

A further novel feature associated with "video strips" is that the constituent images (frames) are disjoint. In other words, the constituent images of a video strip are more analogous to a slide show, keyed to the user's particular information request, than to a conventional movie format comprised of a sequence of conjoint images.

As will become apparent, advantages of the invention include, but are not limited to, ease of use by mobile users whereby a mobile user may expeditiously construct an information request using his or her personal communication device (e.g., cell phone) by either texting (e.g., SMS) to a predefined short code or phone number or otherwise emailing to a predefined email address (e.g., vs@gloto.com). The subject matter of the user information request is simply an abbreviated command syntax optimized for quick entry on a cell phone or other personal communication device. For example, a user may expeditiously construct an information request for an extended weather forecast in a particular zip code using a minimal number of keystrokes on his or her cell phone, i.e., "W 11525". A central host site responds to each information request by collecting relevant content in real-time and organizing the content as a video strip attachment to an MMS message or email.

By responding to information requests quickly and by constructing and transmitting video strips back to requesting users in a format that is easily and naturally viewed on the user's mobile device, it is believed that consumers, having little time or interest in watching continuous content, such as TV or full-motion videos, will be more receptive to making information requests in the manner described herein. Another key advantage of using a video strip format for responding to user information requests is that the format is highly compressible, since the constituent images of the video strip are relatively static and rendered at such a low underlying frame rate (e.g., 12 frames/sec), which consequently contributes to a high transfer rate. As such, network bandwidth is conserved.

Further advantages provided by the invention include, no login screens, no user accounts, no "system busy" logic, no downloadable software or specialized hardware, a single display mode that uses an existing video-player in the cell phone, a single display format optimized for ease of use, and a built-in ad supported monetization model that does not detract from the user experience.

BRIEF DESCRIPTION OF THE DRAWINGS

These and other objects, features and advantages of the present invention will be apparent from a consideration of the following Detailed Description of the invention, when considered in conjunction with the drawing Figures, in which.

DETAILED DESCRIPTION OF THE INVENTION

As a general overview, the present invention is designed to overcome the obstacles to obtaining all manner of information on a personal communication device, such as a mobile device, and more particularly a cell phone. To that end, the present invention provides, in the described embodiments, a network-based information system and associated method that responds to information requests from users of personal communication devices. As will become apparent, a key feature of the network-based information system is the construction of "video strips" in real-time for transmission to users of personal communication devices making information requests.

Generally, a video strip, is preferably constructed by and transmitted from a central host site, in real-time, and is comprised of a sequence of images (frames), rendered within the context of a video or similar continuous format, such as Flash™. The video strips are intended to be played back to requesting users at a low playback rate, on the order of 1 frame every 2 seconds. In some embodiments, the video strip may also include, in addition to a sequence of images, one or more static interstitial ads inserted among the sequence of images. In some embodiments, animated pre-roll and/or post-roll frames may also precede and/or follow the content frames. In some embodiments, the video strip may also include a "text crawl" feature, which can be inserted into the video strip to caption the content or as an additional source of advertising revenue.

The system is designed to accommodate users by not requiring sign up procedures, specific mobile providers, special software downloads or hardware capabilities, or special services and mobile plans such as mobile Internet.

The application of the present invention is not limited to any particular "image" type in the construction of a "video strip". Exemplary image types include photographic images, text images, scanned images, etc. As used herein, the term remote indicates that the content providers are at locations separate from the central host site. The Communication Network 30 may be of a variety of forms, including, but not limited to, a local area network (LAN), a wide area network (WAN), the Internet, etc. The communication network may employ hard-wired (e.g., Ethernet) or wireless (e.g. 802.11) connections.

System

Figure 1:
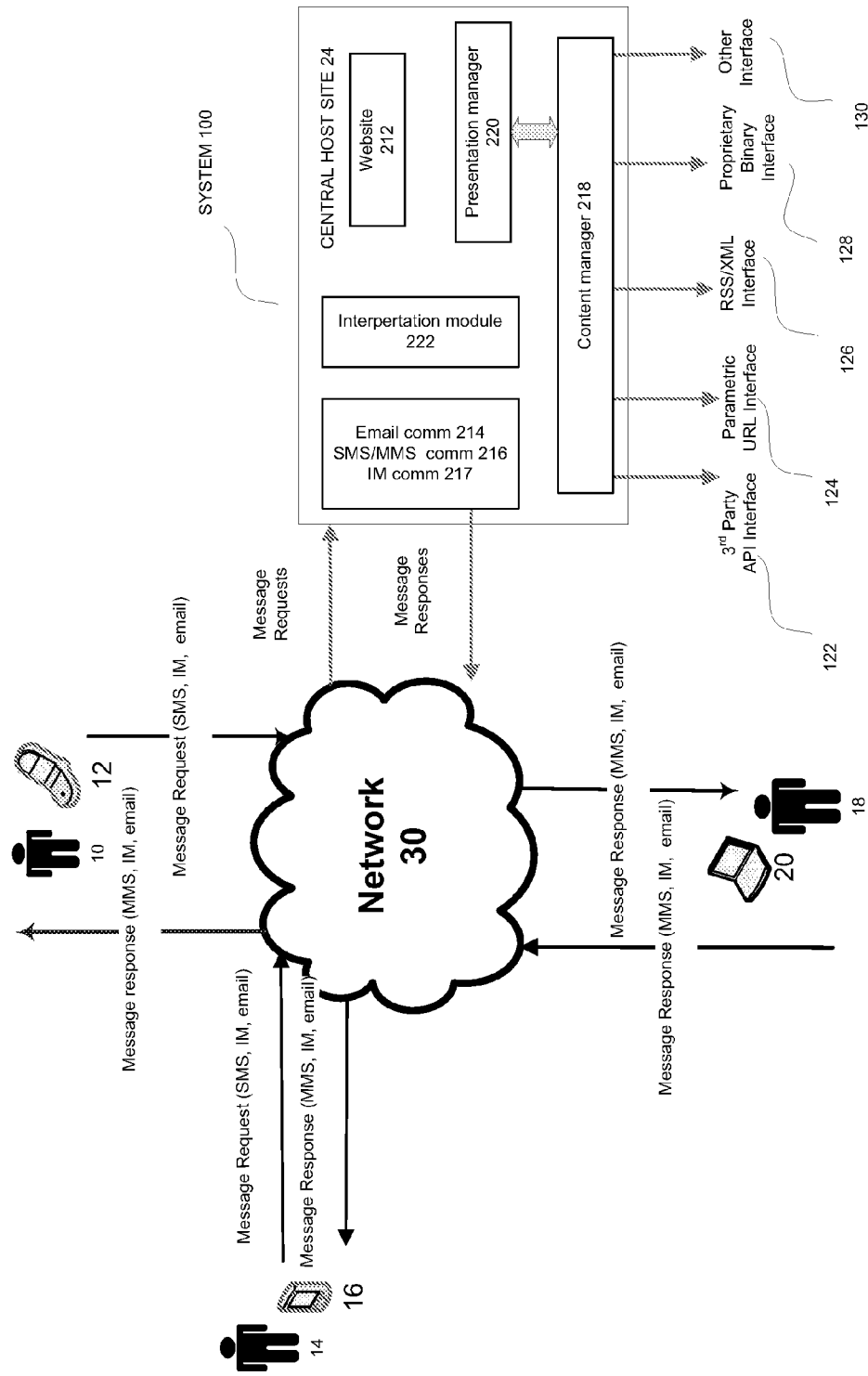
FIG. 1 is a block diagram of a system according to an embodiment of the present invention.

Referring now to FIG. 1, one embodiment of an exemplary system for responding to information requests from users of personal communication devices, such as mobile telephones, and more particularly cellular telephones, will now be described.

Personal communication devices may include, for example, a Cellular Telephone 12 used by a first Mobile User 10, a Personal Digital Assistant ("PDA") 16 that includes telephone capabilities used by a second Mobile User 14, and a handheld or laptop Computer 20 that includes telephone and/or networking capabilities, used by a third Mobile User 18, or any other similar client side, user system known in the art. Personal Communication Devices 12, 16, and 20 are assumed to be equipped with at least a video capability for implementing the methods of the invention. The Personal Communication Devices 12, 16 and 20 are merely representative of typical platforms that can make information requests using the techniques described herein. That is, information requests may also be made in other portable phones, and in other hand held devices in general. It should be understood that any fixed or mobile device may be used that is capable of sending a text message or email and receiving and viewing a video or other continuous digital format.

Users 10, 14 and 18 of respective Personal Communication Devices 12, 16 and 20 make information requests (i.e., "message requests") at random intervals to Central Host Site 24 via the Communication Network 30, which may be any known or envisioned network.

Central Host Site 24 is configured to perform processing, supervisory and management functions associated with the reception and processing of information requests from Users 10, 14 and 18 of Personal Communication Devices 12, 16 and 20. A typical processing function performed by the Central Host Site 24 is the creation of individualized "responses", in the form of "video strips", in response to "requests" received from the respective Users 10, 14 and 18. The request/response protocol is on a one-to-one basis. That is, each request results in a single response from Central Host Site 24. The elements of Central Host Site 24 are described as follows with reference to FIG. 2.

Figures 2A, 2B:
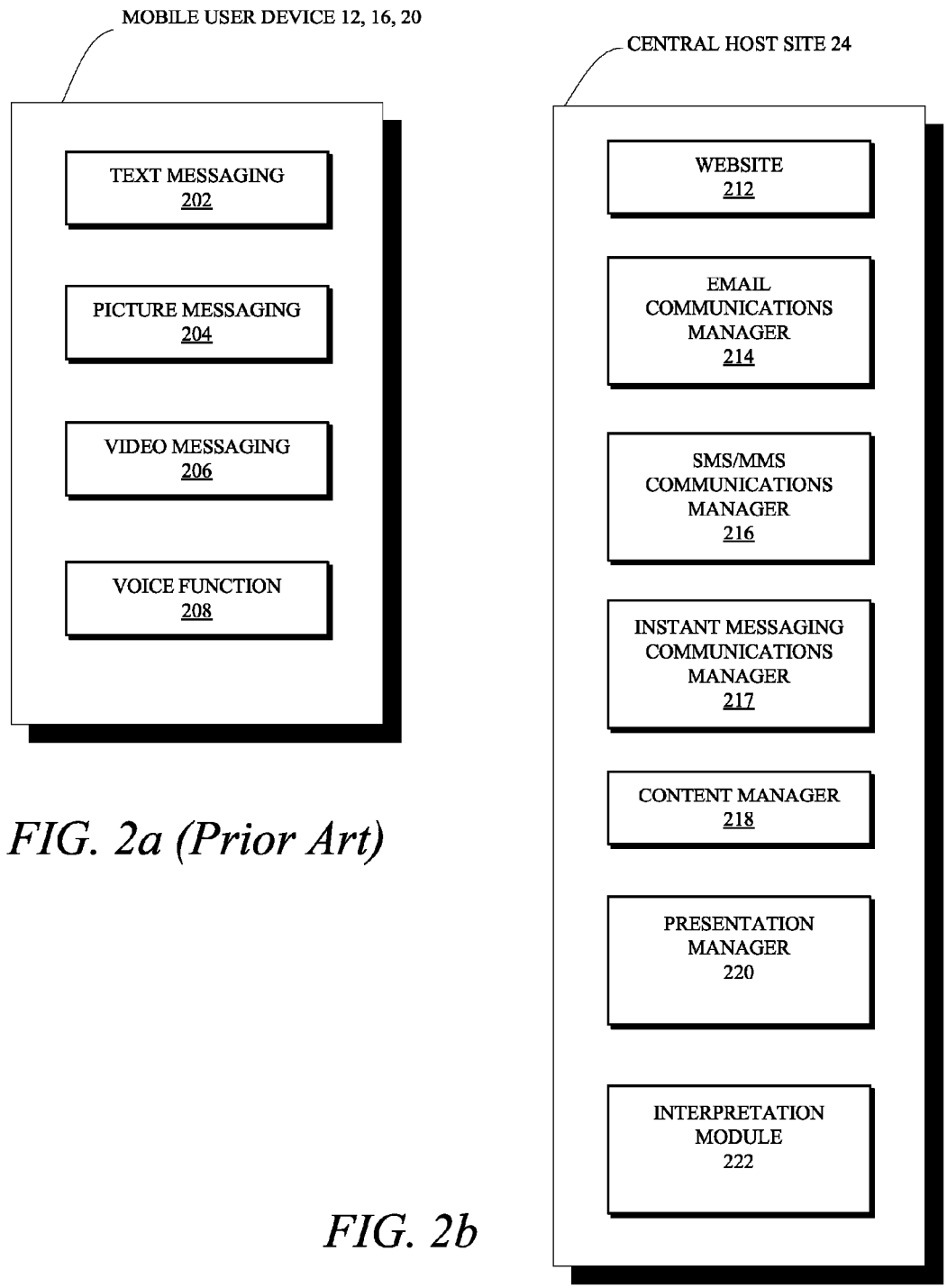
FIGS. 2a and 2b are more detailed block diagrams of the personal communication devices and central host site of FIG. 1, respectively, in accordance with an embodiment of the present invention.

Referring now to FIGS. 2a and 2b, there is shown in detail, those functions of a Personal Communication Device 12, 16 and 20 and of a Central Host Site 24 that are relevant to the present invention.

Referring first to FIG. 2a, a Personal Communication Device 12, 16 and 20 includes four primary components, which are well known in the art. The four components include; a Text Messaging component 202 for sending/receiving/viewing SMS text messages; a Picture Messaging component 204 for sending/receiving/viewing still images via email or MMS; a Video Messaging component 206 for sending/receiving/viewing short video clips via email or MMS and a Voice Function 208 for handling conventional phone calls. As discussed above, the present invention advantageously does not require a personal communication device to utilize special software downloads or special services, such as mobile Internet. Rather, it is contemplated to facilitate service usage by allowing any user with a video capable camera phone that has knowledge of either: the Central Host Site 24 short code, phone number, instant message id, or email address to make information requests and receive a response in the form of a "video strip" from the Central Host Site 24.

The Central Host Site 24 is shown to be comprised of seven primary components. They are described as follows.

A Website 212 of Central Host Site 24 is configured to provide instructions and other promotional material associated with an information service. In the described embodiment, no user registration is required with the website to participate in the information service, thereby facilitating user receptivity of the service. The Website 212 is preferably decoupled from the process of constructing video strips in response to user requests. It should be appreciated that the Website 212 is an optional feature that may enhance user participation in the inventive System 100. However, it should be understood that the Website 212 is not a required element in the System 100. That is, the System 100 is capable of receiving information requests and providing video strips in response to those requests, with or without Website 212.

An Email Communications Manager 214 of Central Host Site 24 is configured to receive and process inbound email information requests for video strips and send outbound email responses including video strips.

An SMS/MMS Communications Manager 216 of Central Host Site 24 is configured to receive and process inbound SMS requests for video strips and send outbound MMS responses including video strips.

An Instant Messaging Communications Manager 217 of Central Host Site 24 is configured to receive and process inbound instant messaging requests for video strips and send outbound instant messaging responses including video strips.

Generally, when the System 100 receives an inbound request from a User 10, 14, 18, the request may be in the form of an email request, an SMS request or an IM request. A response is generally issued from the Central Host Site 24 of System 100 using the same protocol as the request. For example, an IM request received via an IM protocol is preferably responded to by the Central Host Site 24 of System 100 using the same IM protocol. Similarly, an SMS request or email request is preferably responded to by the Central Host Site 24 of System 100 using an MMS response or email response, respectively.

As is well known in the communication arts, IM requests, SMS requests and email requests do not require a priori user registration at a receiving system, in accordance with their respective communication protocols. Therefore, the receiving system can only respond to a request based on the information provided, i.e., cell phone # associated with an SMS request, an email address associated with an inbound email request or an IM username with an IM request.

By way of example, for an IM request, the presently described System 100 captures the requesting user's ID and input channel at the time of the request. So, if a user, for example, sends an IM request via AOL IM, the only means for responding to that user is via the username on the AOL service. No other response option exists given that the System 100 has no other information about the user unless it is can be derived by cross referencing the user's unique input information (IM id, email address, cell phone number) to another database or source that exists outside of System 100.

It should be understood that the Email Communications Manager 214, SMS/MMS Communications Manager 216, and Instant Messaging Communications Manager 217 are multi-threaded and implement queuing logic to handle multiple simultaneous requests and responses from mobile users.

A Content Manager 218 of Central Host Site 24 is configured to retrieve and aggregate requested content from web-based information providers as well as to retrieve targeted ads or sponsorships from advertisers. The information providers may be partners or any suitable information source that may exist on a network, such as the Internet. In some embodiments, third-party content providers provide advertisements and sponsorship data as well as requested user content because of pre-existing business relationships and infrastructure. In these situations, the Content Manager 218 will not need to interface to the advertisers directly.

A Presentation Manager 220 of Central Host Site 24 is configured to take the content and advertisements generated by the Content Manager 218 and construct a video strip. In certain embodiments, the construction of a video strip comprises combining the following elements—a pre-roll, a post-roll, a textual crawl, one or more interstitial ads, and the user requested content. The Presentation Manager 220 is further configured to forward a constructed video strip to the Email Communications Manager 214, SMS/MMS Communications Manager 216, or Instant Messaging Communications Manager 217 for dissemination to a Mobile User Device 12, 16 and 20.

The Interpretation Module 222 of Central Host Site 24 is responsible for parsing and interpreting all user requests, whether via the Email Communications Manager 214, the SMS/MMS Communications Manager 216, or the Instant Messaging Communications Manager 217. Those user requests that are invalid or improperly formed result in a generic textual help message or other informative message being sent to the requesting user using the same communication channel that the request came in on.

General Operation

Figure 3:
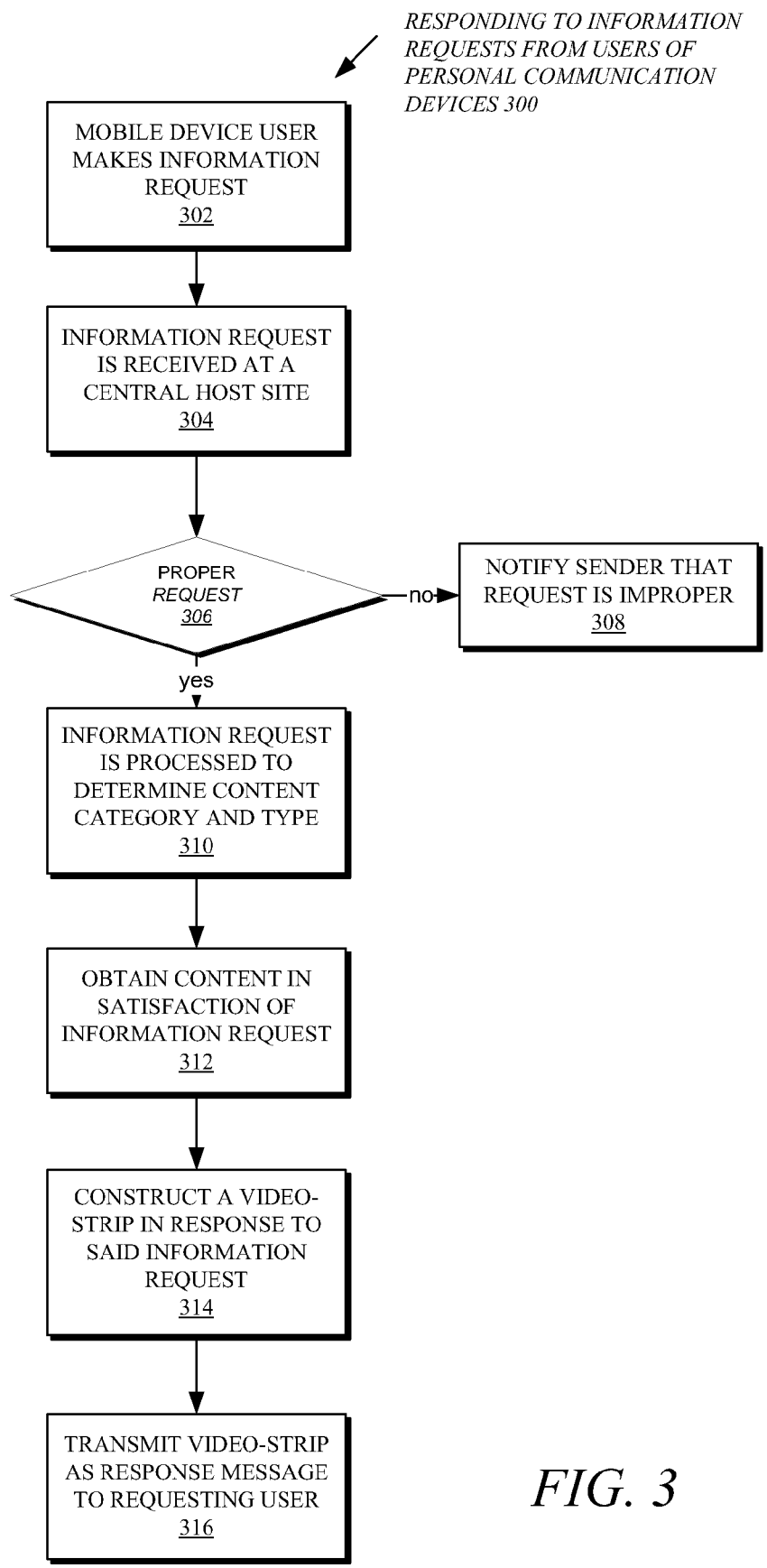
FIG. 3 is a flowchart showing a process for responding to information requests from users of personal communication devices, in accordance with an embodiment of the invention.

With reference now to FIG. 3, there is shown an exemplary process 300 for responding to information requests from users of personal communication devices, such as those shown in FIG. 1, in accordance with an embodiment of the invention. In the described example, the Process 300 is executed by a Central Host Site 24, such as the one illustrated in FIG. 1. A user, such as, for example, User 10, makes an information request, via his or her Personal Communication Device 12 to the Central Host Site 24 (Act-302). To make an information request, a User 10 may send a text message, an instant message, or an email to a specific short code, telephone number, instant message account, or email address from the user's Personal Communication Device 12, 16, and 20.

In one embodiment, it is contemplated to include a command and associated parameters, specifying the particular type of content requested, in the body of the user content request.

Table I below illustrates, by way of example, and not limitation, the syntax of some representative user information requests for content, according to one embodiment. Of course, the syntax of user requests may be different in different embodiments. For example, dedicated email addresses or short codes may be established for individual categories of information requests to eliminate the need for a command prefix. As one example of an alternative command syntax that does not utilize a command prefix, a request for weather data may be made by sending the following: <zipcode or city/state> to weather@gloto.com or directly to the weather provider such as w@weatherbug.com, as an alternative to sending "w <zipcode or city/state>" to vs@gloto.com, as described in Table I.

Given the generic nature of video strips and their applicability to all manner of mobile information requests, it is very likely that established third-party content providers will install the service on their central servers and brand it according to their desires. For example, Mapquest may elect to license the underlying video strip technology for mobile mapping requests and market the service to their users consistent with their brand, e.g., "Get a map on your phone by sending the desired address to m@mapquest.com or short code 12345." For those cases where the technology is licensed by a third-party (e.g., Mapquest), it is envisioned that the System 100 will be hosted on a third-party host site, having some affiliation with the licensing entity.

It should be appreciated that it is only required that the entity receiving the request, e.g., the Central Host Site 24, understand the category and type of content being requested.

TABLE I

| COMMAND | COMMAND PARAMETERS | DESCRIPTION |
| --- | --- | --- |
| S | <Keywords> | Perform an image search based on the provided keywords and return the first 10 images associated with the keywords |
| W | <zipcode or city/state> | Retrieve and extended weather forecast for the zipcode & city/state |
| M | <zipcode or address> | Retrieve a sequence of street maps at different range scales centered on the entered zipcode or street address |
| CB | <cellblock name> | Retrieve the last 10 images posted to the cellblock picture posting website |

In the presently described embodiment, a user can request information from the Central Host Site 24 through standard communications channels and services that the cell phone uses to communicate voice and data. Short Message Service (SMS), Long SMS (i.e., concatenated SMS), Enhanced Message Service (EMS) and e-mail are examples of services though which the cell phone can make an information request. In general, the described embodiment may use any data transmission package in any communications channel (and associated service) native to the sending cell phone, to make an information request. Communications channels and services that are "native to the sending cell phone" are those for which the cell phone is designed and manufactured to handle, and for which the cell phone has a sufficient level of service to use.

An information request is received at the Central Host Site 24, either by the Email Communications Manager 214, in the case where the information request is sent as an email request, or by the SMS/MMS Communications Manager 216, in the case where the information request is sent as an SMS request, or by the Instant Messaging Communications Manager 217 in the case where the information request is sent as an instant message. (Act-304).

Depending upon the type of information request, either the Email Communications Manager 214 processes the request, in the case where the information request is sent as an email request. The SMS/MMS Communications Manager 216 processes the request, in the case where the information request is sent as an SMS request, and the Instant Messaging Communications Manager 217 processes the request, in the case where the information request is sent as an instant message. Processing a request comprises first determining that the request adheres to the basic command syntax presently in use by the System 100 (S-306). Basic error checking and syntax compliance is performed by the appropriate communications manager (i.e., 214, 216, or 217) of System 100 that receives the user request.

If a request is received that is improperly formatted or is otherwise unintelligible, a text, email, or instant message is instantly transmitted back to the sender notifying him or her that the request cannot be properly processed by the system (S-308). The return text message preferably includes help information to assist the sender in constructing a properly formatted request. Otherwise, if it is determined that the request is properly formatted, the request is parsed to determine the category and type of content being requested by the user (Act-310).

Parsing is performed by the Interpretation Module 222 of the System 100. Upon determining the category and type of content being requested, the identified content and category is supplied to the Content Manager 218 of the System 100 to facilitate interaction with one or more remote content providers to obtain relevant content in satisfaction of the request (Act-312). The content may also be obtained locally at the Central Host Site 24 from one or more local databases, or a combination of local and remote accesses, as is necessary.

Referring back again to FIG. 1, there is shown a plurality of user interfaces for facilitating communication between the Central Host Site 24 and the various content providers. The interfaces include, a $3^{rd}$ Party API Interface 122, a Parametric URL Interface 124, an RSS/XML Interface 126, a Proprietary Binary Interface 128, and one or more other Interfaces 130.

In some embodiments, third-party content providers will provide advertisements and sponsorship data as well as requested user content because of pre-existing business relationships and infrastructure. In these situations, the Content Manager 218 will not need to directly interface with the advertisers.

Upon collecting the information necessary to construct a video strip from one or more remote content providers at the Central Host Site 24, including content and optional advertising data, the Presentation Manager 220 of System 100 constructs a video strip in a manner to be described further below (Act-314).

Video strips are preferably generated in real-time in response to user requests. In some embodiments, it is contemplated to pre-store certain responses to user requests in anticipation of the requests. Pre-storing responses may be appropriate, for example, for those requests having responses that are time-insensitive, such as those pertaining to popular queries. In this manner, system performance and scalability may be enhanced.

Video Strip Structure

Figure 4A:
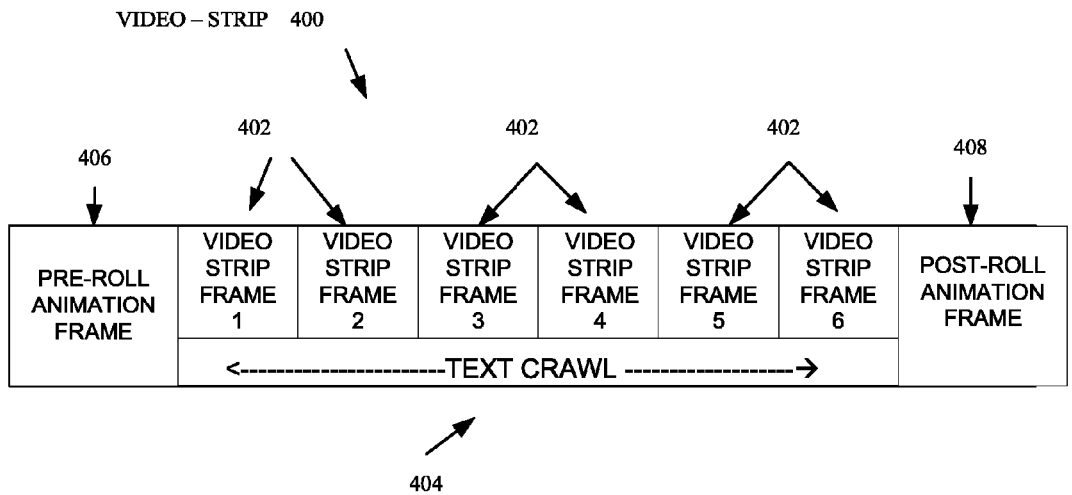
FIGS. 4a & 4b illustrate the construction of an exemplary video strip, in accordance with an embodiment of the invention.

Referring now to FIG. 4a, there is shown a general structure of a Video Strip 400, according to one embodiment. The Video Strip 400 is comprised essentially of a sequence of Video Strip Frames 402. For purposes of the present application, a video strip frame is an image displayed to a user of a personal communication device that illustrates content to the user for a period of approximately 2 seconds. The preferred display period creates the impression of a still image. The video strip frames are sometimes referred to as core frames in that they display content deemed to be relevant to a user information request. Six such frames are shown by way of example in FIG. 4a.

Figure 4B:
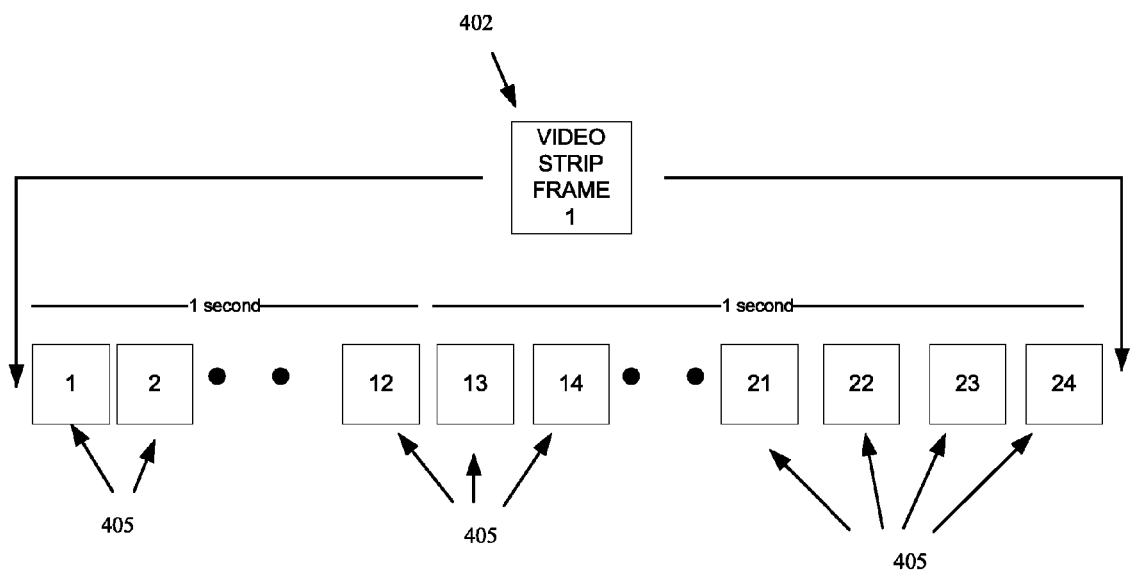

It should be understood that the Video Strip Frames 402, (i.e., core frames) as shown in FIG. 4a, are not actual video frames, as are well known in the video arts. Rather, the Video Strip Frames 402 are images displayed to a user at a slow playback rate (i.e., on the order of 2 seconds per frame). The slow playback rate of the Video Strip Frames 402 arise from a rendering of a constituent number of underlying actual video frames 405, rendered at a pre-determined frame rate (e.g., on the order of 12 frames/sec), as shown in FIG. 4b. The process of rendering a video strip (i.e., the video strip frames that comprise a video strip) is described as follows.

Rendering a Video Strip

Generally, a Video Strip 400 is rendered within the context of a video or similar continuous format, such as Flash™. In addition to the core content oriented frames, referred to herein as Video Strip Frames 402, the video strip may also optionally include a Pre-Roll Animation Frame 406 and a Post-Roll Animation Frame 408 to show continuous motion data such as an introductory or concluding message or sponsorship.

FIG. 4b illustrates the construction and display rate of the first video strip frame, i.e., video strip frame 1 (402) of the Video Strip 400 of FIG. 4a. As shown in FIG. 4b, video strip frame 1 (402) is comprised of 24 actual video frames 405, rendered at an underlying frame rate of 12 frames per second. Because each actual Video Frame 405 is virtually identical to its neighboring frame, upon playback of the Video Strip 400, an impression is created in the viewer's mind that the Video Strip Frames 402 of the Video Strip 400 are being played back at a frame rate on the order of 1 frame approximately every 2 seconds. In other embodiments, it is contemplated to display the Video Strip Frames 402 at rates as low as 1 frame/sec and as high as 3 frames/sec. Thus, the astute reader will recognize that a video strip playback rate on the order of 1 frame approximately every 2 seconds is analogous to the playback of a sequence of still images being displayed at a low frame rate. What is transparent to the user (viewer) is that the underlying (actual) frame rate of the Video Strip 400 is on the order of 12 frames per second, as described above. Of course, in some embodiments, the underlying frame rate can be lower or higher than 12 frames per second in conformance with the rendering format in use.

Generally, the underlying (actual) rendering frame rate of a video strip is at least 10 frames per second, and preferably 12 frames per second for a 3gp video format to permit the rendering of continuous pre-roll and post-roll animation frames and the text crawl while minimizing file size and preserving transmission bandwidth.

Video Strip Construction

In operation, image files (.jpg, .png, .gif, etc.) are returned from a search engine query and resized to fit the form factor of a Video Strip 400. However, it is also contemplated to construct a Video Strip Frame 402 from disparate textual data or a combination of smaller iconographic data in common digital formats (.jpg, .png, .gif, etc.) and textual data. One example of this latter approach is the construction of a weather video strip. For these video strip types, a Video Strip Frame 402 is constructed from both raw textual data and a separate icon image returned in an XML document. Thus, the Video Strip Frame 402 represents a composite image from two disparate sources.

Video Strip Optional Features

Continuing with FIG. 4, the Video Strip 400 is shown to further comprise an optional "Text Crawl" 404 feature, which is a moving message positioned along either the top or bottom of the frame sequence. FIG. 4 shows the Text Crawl 404 along the bottom of the frame sequence. In some embodiments, the text crawl may be placed along the top of the Video Strip 400 to enhance readability of the presented text. Typically the Text Crawl 404 is related to the user request and may, for example, display a user provided command string, e.g., M 1600 Pennsylvania Ave Wash D.C., to remind the user of the associated request. More typically, the text crawl may display sponsorship information or other advertising related data associated with the type and syntax of a user request. For instance, a map request for the area code 21797 may result in the text crawl "M 21797—Maps courtesy of Mapquest."

The Video Strip 400 may further optionally comprise one or more "Pre-Roll" Animation Frames 406. A Pre-Roll Animation Frame 406 is shown in FIG. 4a. The Pre-Roll Animation Frame 406 is constrained to display a short introductory message as a continuous motion video, typically, but not exclusively, associated with sponsorship or advertisement.

As a further optional feature, the Video Strip 400 may further comprise a single "post-roll" animation frame 408, which is a short concluding continuous motion video, which is typically, but not exclusively, associated with sponsorship or advertisement.

It should be noted that the pre-roll 406 and post-roll 408 animation frames appear to the viewer as continuous motion videos in contrast with the Video Strip Frames 402 which appear to the viewer as still images.

Upon completing the construction of a Video Strip 400 at the Central Host Site 24, it is transmitted back to the user making the information request to be either played back or stored on the requesting user's personal communication device (Act-316).

Retrieving Content Relevant to User Requests

Upon receiving a user request, the Content Manager 218 of System 100 performs a plurality of queries using interfaces and protocols that may be unique (and proprietary) to each content provider. Some queries, for example, may result in a search through a local database whereas other queries may require network access to other third-party content providers and websites. Advertising or couponing queries, described below, based on the demographic or geographical location of the user at the time of the request may also be performed to generate appropriately targeted advertising material for use in the video strip. For example, the results of an advertising or couponing query may be incorporated into one or more of the pre-roll, post-roll and interstitial ads, which comprise a part of the video strip (see FIG. 4).

The images to be used for the Video Strip Frames 402 are retrieved from internal sources, external sources and combinations thereof in satisfaction of a user information request. The images to be incorporated into the constituent Video Strip Frames 402 are selected so as to increase the likelihood that the first few video strip frame images of a Video Strip 400 confidently satisfy the user's information request. For instance, as is well known, most image search results on the Internet (e.g., Google™ searches) are organized such that the most commonly requested or relevant images are placed at the top of the results page. In a similar manner, the most relevant image search results are placed at the front of the Video Strip 400 (i.e., video strip frames 1 and 2). In certain embodiments, it is contemplated to interlace results from multiple third-party content providers to provide more compelling or inclusive results for the user. It is noted that a video strip frame image may also comprise static text represented as image data (e.g., text based weather information).

Readability of a Video Strip on a Personal Communication Device

The System 100 employs methods and algorithms to maximize the readability and desirability of the video strip content on small screen devices, such as those illustrated in FIG. 1. For instance, an image search may require access to several local and/or remote databases to retrieve raw results which are then aggregated and formatted in such a way as to make the information suitable and more effective on a small screen. In a similar manner, requests for mapping data are optimized for certain use cases and may display zoom levels, directions, or center positions not associated with a standard web query on a computer. User experience factors are also considered during the creation of a video strip including, but not limited to, formatting, font size, background and foreground color, and resolution.

It is a general objective of the invention to maximize readability of a video strip on a user device while simultaneously minimizing file size. The tradeoff of readability versus size becomes an issue when transmitting map data or other highly detailed images. Maps typically require higher resolution images since they often have small street names on the image rendered at odd angles. When transmitting map data, it is contemplated to use different bit rates and video compression factors in the encoder when constructing the video strip to minimize the file size while preserving readability. This is necessary in that map data does not compress as well as standard images.

Construction of a Video Strip

The physical construction of the video strip into a mobile video or other continuous format such as Flash™ requires the use of one or more pipelined software processes on the system's servers. All of the digital material comprising the video strip (pre-roll, post-roll, interstitial ads, frame content, and text crawl) is rendered through a multi-phase process into a single continuous movie encoded in a particular format such as, for example, 3g2 or 3gp. Other well known or envisioned formats are contemplated by the invention.

Generally, the number of Video Strip Frames 402 in a Video Strip 400 is not predetermined but may vary based on a number of factors including, but not limited to, the type of information request, the time of the request, the availability of suitable data to satisfy the request, and advertising considerations.

Heuristics and other algorithms are employed to optimize the resultant Video Strip 400 for distribution over potentially bandwidth-constrained wireless resources. This optimization may take into account many factors including, but not limited to, screen resolution, request type, video strip transmission size, current bandwidth capacity and demand, time of day, and overall length of the video.

In some embodiments, it is contemplated to send a fewer number of Video Strip Frames 402 per Video Strip 400 at times of peak usage, to satisfy a greater number of users.

Monetization of the Process

One potential source of revenue which may be derived from the monetization of the invention relates to a couponing or points system to encourage the user community to make information requests for video strips from their personal communication devices.

In a couponing system, a packaged goods manufacturer would associate a discount for an item to the user's mobile phone number that made a request for a video strip. For example, John Smith, calling from mobile phone number 514-336-9872 makes an information request for designer jeans. Levis or some other participating jeans manufacturer, associates a discount for designer jeans to John Smith's mobile phone number, i.e., 514-336-9872. Alternatively, or in addition to providing such discounts, a manufacturer, may also choose to sponsor the video strip and present a video strip ad that recites "15% off on your next purchase at Best Buy." To redeem the 15% discount, a user visiting the retail outlet (e.g., Best Buy) would enter his or her mobile number into a point of sale system, by either telling it to the cashier or entering it on a keypad, and the discount would be automatically applied.

In another embodiment, one way of monetizing the invention is to set up a points system for video strips that mimics the well-known frequent flyer miles points system. In such a system, users collect points for making requests and will be able to redeem the points either online or at various locations through participating businesses. In one implementation, users may collect, what are referred to as "Gloto™ points", for redemption purposes. Gloto™ points refer specifically to a point system described and managed at an associated website by the same name, www.gloto.com. It is also contemplated that other businesses using the video strip technology and service to deliver content to mobile users may design and operate their own promotions, points systems', or couponing systems to encourage consumption of their branded content or services.

Demonstration Example

An example of a typical interaction between a user making an information request from a personal communication device to a central host site processing the response via the construction of a video strip follows. Of course, other arrangements and demonstrations are possible using various exemplary components described herein.

Figure 5:
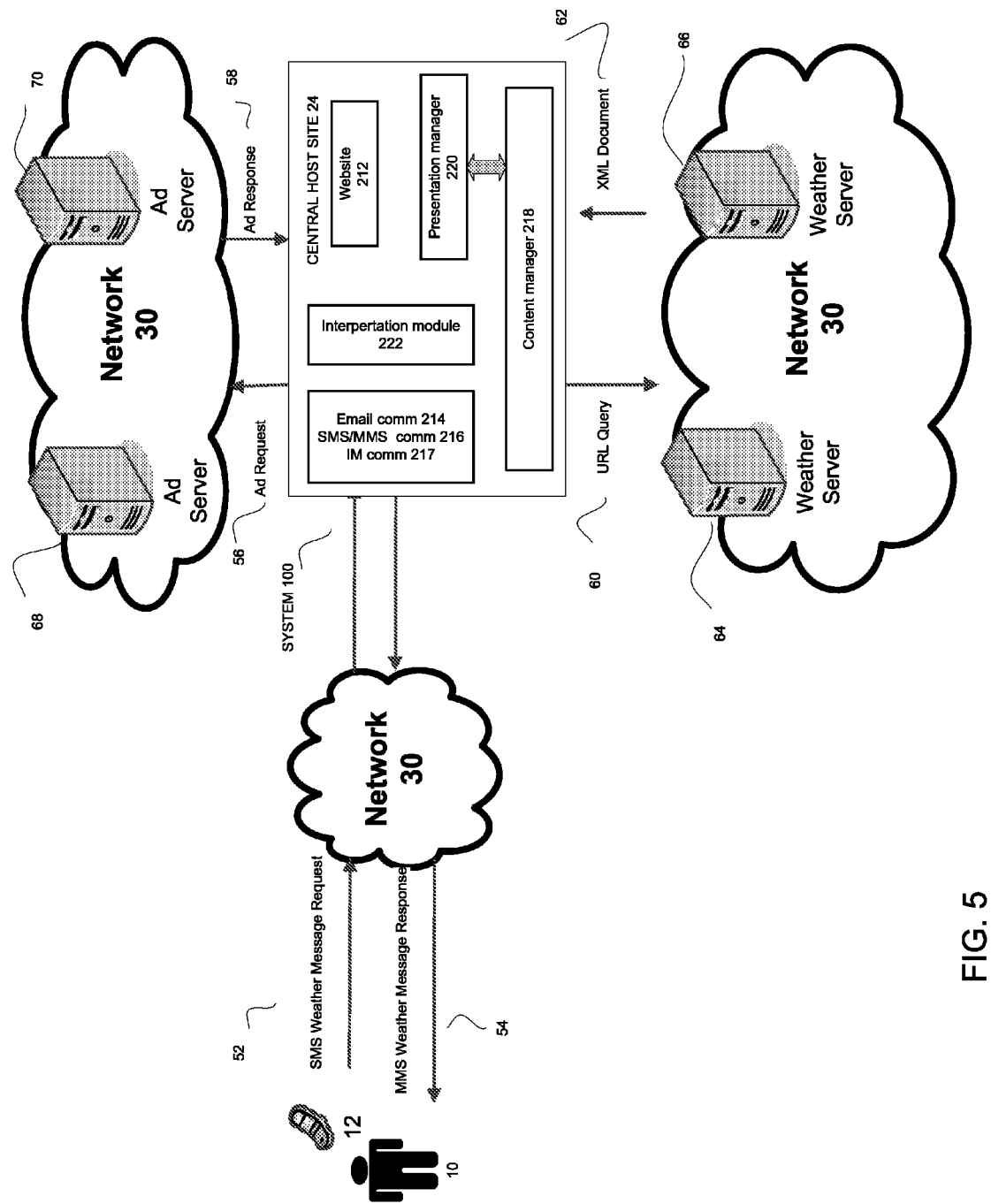
FIG. 5 is a block diagram of the system of FIG. 1 for an exemplary embodiment as described in FIG. 6.
Figure 6:
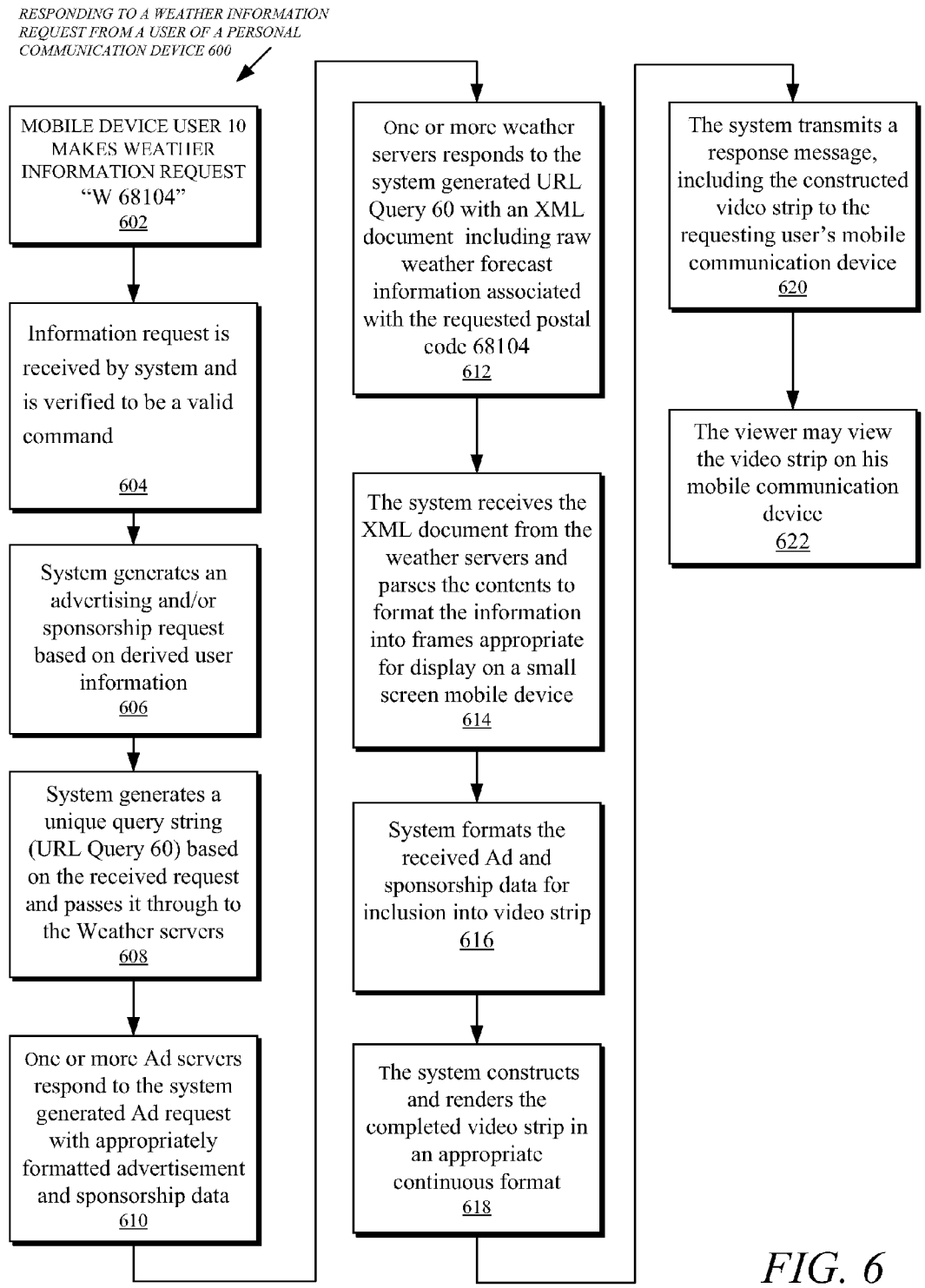
FIG. 6 is a flowchart showing an exemplary process for responding to an exemplary request for weather information from a user of a personal communication device.

Reference is now made to FIGS. 5-7 to further illustrate the invention principles.

Prior to describing the Process 600, it is instructive to first illustrate and describe what a user is shown in response to making a request for weather information, in accordance with one embodiment of the invention.

Figure 7A:
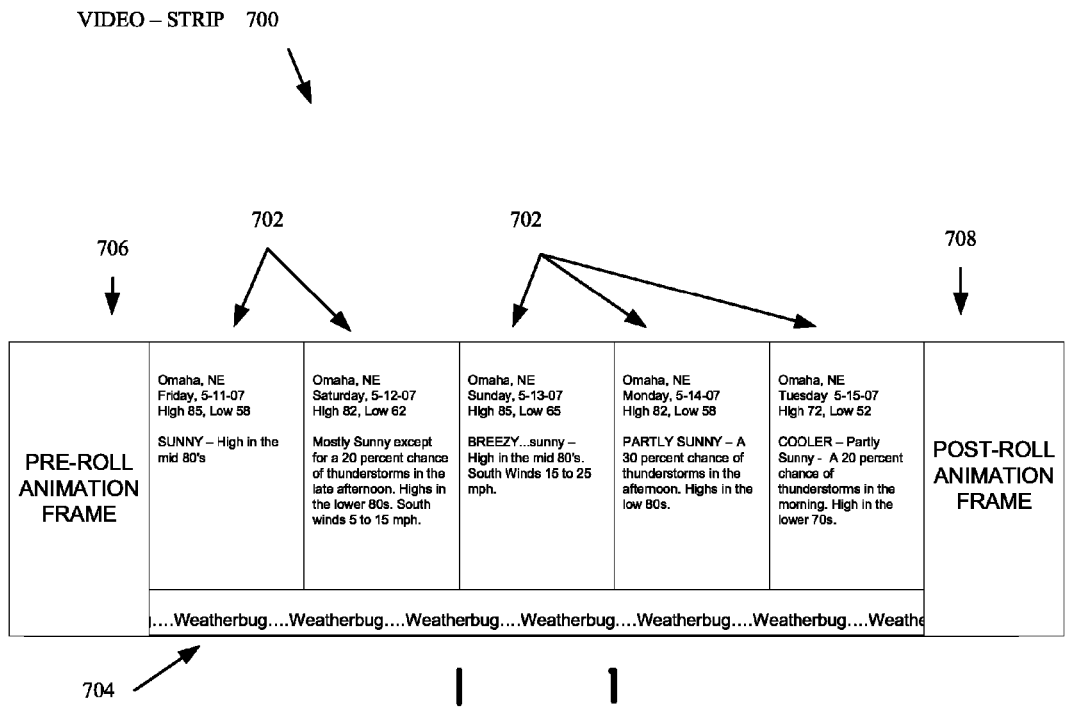
FIGS. 7a & 7b illustrate the construction of an exemplary video strip, in response to a user request for weather information for a particular zip code.

FIG. 7a illustrates an exemplary Video Strip 700 that is returned to a User 10 making a request for weather information in zip code 68104, i.e., "W 68104".

As discussed above, an information request may be made in any number of different formats, some of which are described, by way of example, in Table II. Note that the fifth row of Table II describes the particular command syntax and format shown, by way of example, in Table I.

TABLE II

| Command | Issued To | Format |
| --- | --- | --- |
| 68104 | weather@gloto.com | Email |
| Omaha, NE | weather@gloto.com | Email |
| 68104 | w@weatherbug.com | Email |
| Omaha, NE | w@weatherbug.com | Email |
| W 68104 | vs@gloto.com | SMS message |
| W 68104 | IM username: glotobot | IM |

The Video Strip 700 returned to the requester is comprised of a Pre-Roll Animation Frame 706 (optional), five content oriented Video Strip Frames 702 and a Post-Roll Animation Frame 708 (optional). The video strip further includes a Text Crawl 704, along the bottom.

Figure 7B:
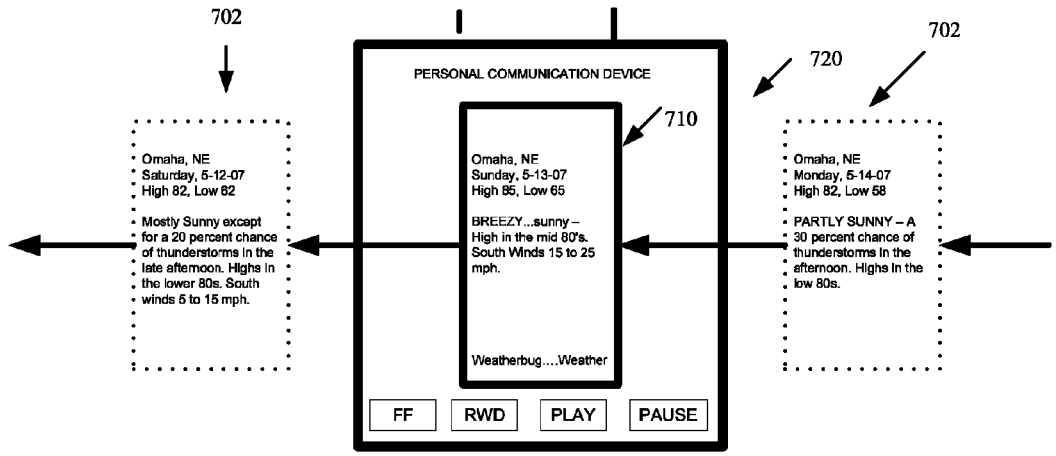

FIG. 7b illustrates how the Video Strip 700 is viewed on a Display 710 of the requestor's Personal Communication Device 720. FIG. 7b illustrates what a requester would view at a point in time coincident with the display of the third content oriented Video Strip Frame 702 of FIG. 7a, i.e., the weather for Sunday May 13, 2007 in Omaha, Nebr.

Each video strip frame is displayed to the requester for approximately two (2) seconds, in accordance with a preferred embodiment. During the display of a given video strip frame, approximately 24 constituent underlying video frames are rendered. That is, from the requestor's perspective, each video strip frame appears to the viewer as a static image.

Referring now to FIG. 6, there is shown an exemplary Process 600 for responding to an exemplary user request for "weather related" information. In accordance with the instant example, a User 10 (i.e., information requester) makes a specific request for a five day weather forecast for Omaha, Nebr. for the zip code 68104. The request is made via the user's Personal Communication Device 720. The Process 600 is performed in the context of the system illustrated in FIG. 5.

At Act 602, a User 10 makes an information request via his or her personal communication device 12 to the Central Host Site 24. More particularly, a User 10 sends an SMS message to a predetermined short code (e.g., 68104) or email address (vs@gloto.com). The content of the message is the command "W 68104".

At Act 604, the System 100 situated at the Central Host Site 24, the message is received by the Interpretation Module 222, which verifies that "W 68104" is a valid command and interprets "W 68104" as a request for a 5-10 day forecast for postal code 68104 (i.e., Omaha, Nebr.).

At Act 606, the System 100, situated at the Central Host Site 24, optionally generates an advertising and/or sponsorship request based on derived user information, including, but not limited to, demographics, cell phone number, geographical position and current time. The advertising and/or sponsorship request (i.e., Ad Request 56) is issued from the Central Host Site 24 to Ad Servers 68, 70.

At Act 608, the System 100, situated at the Central Host Site 24, generates a unique query string (URL Query 60) based on the received request and passes it through to the Weather Servers 64, 66, via a URL query string, to a predetermined URL.

At Act 610, one or more Ad Servers 68, 70 respond to the Ad Request 56 with appropriately formatted advertisement and sponsorship data for inclusion in the Video Strip 400.

At Act 612, one or more Weather Servers 64, 66 responds to the URL Query 60 with an XML Document 62 including raw weather forecast information associated with the requested postal code 68104 (i.e., Omaha, Nebr.) for inclusion in the video strip.

At Act 614, the System 100, situated at the Central Host Site 24, receives the XML Document 62, parses the contents, and formats the information into frames appropriate for display on a small screen mobile device.

At Act 616, the System 100, situated at the Central Host Site 24, receives the appropriately formatted advertisement and sponsorship data from the one or more Ad Servers 68, 70 and formats it for inclusion in at least one of the pre-roll 406, post-roll 408 and Text Crawl 404 positions within the Video Strip 400. It may also insert the advertisement as an interstitial frame as part of frame 402.

At Act 618, the System 100, situated at the Central Host Site 24, constructs and renders the completed Video Strip 400 in an appropriate continuous format, such as, for example, 3gp, Flash™, etc.

At Act 620, the System 100, situated at the Central Host Site 24, transmits a response message, including the constructed video strip (See FIG. 7) to the requesting user's Personal Communication Device 12 as an MMS message, instant message attachment, or email attachment.

At Act 622, the viewer may view the Video Strip 700 on a Display 710 of his Personal Communication Device 720 using the built-in video playback capabilities embedded on the mobile communication device. The User 10 has the option of storing the Video Strip 700 in a memory of the mobile communication device for viewing at a later time. When viewing the Video Strip 700, the viewer may stop, start, and pause the video strip. Such features are well known. It should be noted that pausing playback of a Video Strip 700 enables the user to easily peruse the contents of each Video Strip Frame 702 in the transmitted Video Strip 700. Because a Video Strip 700 is rendered as a sequence of disjoint frames of sufficient duration, the act of pausing the video strip playback is quite natural and readily performed on the Personal Communication Device 720.

A novel feature of a "video strip" is that the constituent Video Strip Frames 702 are disjoint. That is, the constituent video strip frames are more analogous to a slide show, keyed to the user's particular information request, than to a conventional movie format comprised of a sequence of conjoint images. This is exemplified in the Video Strip 700 of FIG. 7. Each Video Strip Frame 702 represents an image of text information that is disjoint from the preceding and subsequent frames image. That is, each video strip frame represents the weather for a particular day of the week.

Also, it is likely that certain information providers (image search companies like Yahoo™ or Google™, and map companies like Mapquest™ or Google™, etc.) will have direct relationships with advertisers/sponsors. In these situations, the System 100 may not interact directly with the advertisers (via servers 64, 66 for example), but will instead simultaneously receive both the URL Queries 60 and the Ad Requests 56 from the third-party content providers.

While the invention has been shown and described with respect to particular embodiments, it is not thus limited. Numerous modifications, changes and enhancements will now be apparent to the reader.

What is claimed is:

1. A computer-implemented method for responding to information requests from users of personal communication devices, the method comprising:
    (a) a plurality of users aperiodically requesting content from a central host site by sending messages from personal communication devices of the users, to the central host site, the messages including a request for content from the central host site, the request being generated from the personal communication devices via conventional manufacturer supplied internal software instructions stored and running on the personal communication devices, wherein said internal software instructions are not downloaded from an external source, and wherein said internal instructions are neither included nor embedded as content-client software;
    (b) receiving the messages at the central host site,
    (c) responding to the messages at said central host site by:
        (i) validating the message;
        (ii) parsing the validated message to identify at least a content category and a content type;
        (iii) retrieving said requested content according to said identified content category and type;
        (iv) incorporating the retrieved content in a response message, wherein said response message is constructed in a slideshow presentation format comprised of a non-temporal sequence of primary images, each primary image including at least a portion of said retrieved content,
        (v) transmitting the response message from the central host site to the personal communication device of the user making the request for content, and
    wherein the sequence of primary images are transmitted for display on said user's personal communication device at an image display rate in the range of substantially one image per second to one image per three seconds,
    wherein each primary disjoint image of said slideshow presentation is transparently displayed to the user as a plurality of substantially identical underlying video frames at an underlying pre-determined frame rate.

2. The computer-implemented method according to claim 1, wherein each primary image is a still image in said sequence of images transparently displayed on said user's personal communication device in a slideshow presentation format as a plurality of underlying video frames, rendered at said underlying pre-determined frame rate.

3. The computer-implemented method according to claim 2, wherein the pre-determined frame rate is at least 10 frames per second for a rendering format in accordance with the 3gp technical standard.

4. The computer-implemented method according to claim 3, wherein the pre-determined frame rate is 12 frames per second in accordance with said 3gp technical standard.

5. The computer-implemented method according to claim 1, wherein the network is one of a wireless and wired network.

6. The computer-implemented method according to claim 1, wherein the act of incorporating the retrieved content in a response message, further comprises: rendering the images through a multi-phase process into a single continuous format.

7. The computer-implemented method according to claim 6, wherein the continuous format is encoded according to the 3g2 technical specification.

8. The computer-implemented method according to claim 6, wherein the continuous format is encoded according to the 3g2 technical specification.

9. The computer-implemented method according to claim 1, wherein a request message protocol for receiving said request message is selected from the group of text messaging protocols comprising a Short Text Messaging protocol, an Internet Address Messaging protocol, an email messaging protocol, and an instant messaging protocol.

10. The computer-implemented method according to claim 1, wherein a response message protocol for transmitting said response message is selected from the group of text messaging protocols comprising a Short Text Messaging protocol, an Internet Address Messaging protocol, a Multi Messaging Service protocol, an email protocol, and an instant messaging protocol.

11. The computer-implemented method according to claim 1, wherein the personal communication device is one of a wired or wireless device.

12. The computer-implemented method according to claim 1, wherein the act of retrieving said requested content according to said identified content category and type, further comprises:
    accessing at least one remote content source based on said identified content category and content type; and
    retrieving said content from the at least one remote content source.

13. The computer-implemented method according to claim 1, wherein the act of retrieving said requested content, according to said identified content category and type, further comprises:
    accessing at least one local database based on said identified content category and content type; and
    retrieving said content from the at least one local database.

14. The computer-implemented method according to claim 1, wherein the act of retrieving said requested content according to said identified content category and type, further comprises:
    determining at least one of the group comprising: (a) a geographical position of said user, (b) a demographic of said user and (c) a time of day associated with making said request;
    determining appropriate advertising themes corresponding to said at least one of the group comprising (a) geographical position of said user, (b) said demographic of said user and (c) said time of day associated with making said request; and
    accessing at least one of a remote content source and a local database to retrieve appropriate advertising content consistent with said determined appropriate advertising themes.

15. A non-autonomous system for linking data related to a set of similar digital images, the system comprising:

at least one processor;
  a memory connected to the at least one processor and storing instructions for operating the at least one processor to perform the steps of:
  (a) receiving a message including a user request for content, the request being received over a network from a user of a personal communication device using conventional manufacturer supplied internal software not downloaded from an external source for making said request, and wherein said internal instructions are neither included nor embedded as content-client software;
  (b) responding to the request message by:
    (i) validating the request message;
    (ii) parsing the validated request message to identify at least a content category and a content type;
    (iii) retrieving said requested content according to said identified content category and type;
    (iv) incorporating the retrieved content in a response message, wherein said response message is constructed in a slideshow presentation format comprised of a non-temporal sequence of primary images, each primary image including at least a portion of said retrieved content, and
    (v) transmitting the response message from a central host site of the system to the personal communication device of the user making the request for said content, and
  wherein the sequence of primary images are transmitted for display on said user's personal communication device at an image display rate in the range of substantially one image per second to one image per three seconds,
  wherein each primary disjoint image of said slideshow presentation is transparently displayed to the user as a plurality of substantially identical underlying video frames at an underlying pre-determined frame rate.

16. The system according to claim 15, wherein the sequence of images are disjoint images.

17. The system according to claim 15, wherein the images are transmitted for display on said user's personal communication device at an image display rate in the range of substantially one image per second to one image per three seconds.

18. The system according to claim 15, wherein each image in said sequence of images is comprised of a plurality of video frames, rendered at an underlying pre-determined frame rate.

19. The system according to claim 18, wherein the predetermined frame rate is at least 10 frames per second for a rendering format in accordance with the 3gp technical standard.

20. The system according to claim 15, wherein the predetermined frame rate is 12 frames per second in accordance with said 3gp technical standard.

21. The system according to claim 15, wherein the network is one of a wireless and wired network.

22. The system according to claim 15, wherein the act of incorporating the retrieved content in a response message, further comprises: rendering the images through a multiphase process into a single continuous format.

23. The system according to claim 22, wherein the continuous format is encoded according to the 3gp technical specification.

24. The system according to claim 22, wherein the continuous format is encoded according to the 3g2 technical specification.

25. The system according to claim 15, wherein a request message protocol for receiving said request message is selected from the group of text messaging protocols comprising a Short Text Messaging protocol, an Internet Address Messaging protocol, an email messaging protocol, and an instant messaging protocol.

26. The system according to claim 15, wherein a response message protocol for transmitting said response message is selected from the group of text messaging protocols comprising a Short Text Messaging protocol, an Internet Address Messaging protocol, a Multi Messaging Service protocol, an email protocol, and an instant messaging protocol.

27. The system according to claim 15, wherein the personal communication device is one of a wired or wireless device.

28. The system according to claim 15, wherein the act of retrieving said content responsive to said request message, further comprises:
  accessing at least one remote content source based on said identified content category and content type; and
  retrieving said content from the at least one remote content source.

29. The system according to claim 15, wherein the act of retrieving said content responsive to said request message, further comprises:
  accessing at least one local database based on said identified content category and content type; and
  retrieving said content from the at least one local database.

30. The system according to claim 15, wherein the act of retrieving said content responsive to said request message, further comprises:
  determining at least one of the group comprising a geographical position of said user, a demographic of said user and a time of day associated with making said request;
  determining appropriate advertising themes corresponding to said at least one of the group comprising a geographical position of said user, said demographic of said user and said time of day associated with making said request; and
  accessing one of a remote content source and a local database to retrieve appropriate advertising content consistent with said determined appropriate advertising themes.

31. A computer program product operable on a processor at a central host site including computer-executable instructions for performing processing functions in accordance with a method for responding to information requests from users of personal communication devices,
  (a) receiving a message, over a carrier network, including a user request for content, the request being received over a network from a user of a personal communication device using conventional internal software not downloaded from an external source for making said request and wherein said internal instructions are neither included nor embedded as content-client software;
  (b) responding to the message at said central host site including: validating the message;
  parsing the message to identify a content category and a content type; retrieving said content responsive to said request message;
  incorporating the retrieved content in a response message wherein said response message is constructed in a slideshow presentation format comprised of a non-temporal sequence of primary images, each primary image including at least a portion of said retrieved content, and
  transmitting the response message from the central host site to the personal communication device of the user making the request for said content
  wherein the sequence of primary images are transmitted for display on said user's personal communication device at an image display rate in the range of substantially one image per second to one image per three seconds, wherein each primary disjoint image of said slideshow presentation is transparently displayed to the user as a plurality of substantially identical underlying video frames at an underlying pre-determined frame rate.

32. A non-autonomous system for linking data related to a set of similar digital images, the system comprising:

at least one communications manager connected to receive aperiodic messages including a request for content, the request being received over a network from a user of a personal communication device using conventional manufacturer supplied internal software for making said request, and wherein said internal software is neither included nor embedded as content-client software and is not downloaded from an external source;

the at least one communications manager being further configured to transmit a response message from a central host site to the user making the request for content;

an interpretation manager connected to receive the message from the communications manager, validate the request message and parse the validated request message to identify at least a content category and a content type of the message;

a content manager connected to retrieve and aggregate said requested content according to said identified content category and type;

an interpretation manager connected to receive the retrieved content and incorporate the retrieved content in a response message, wherein said response message is constructed in a slideshow presentation format comprised of a non-temporal sequence of primary images, each primary image including at least a portion of said retrieved content, and a presentation manager connected to construct a video strip constructed in said slideshow presentation format from the retrieved content, wherein the sequence of primary images are transmitted for display on said user's personal communication device at an image display rate in the range of substantially one image per second to one image per three seconds, wherein, each primary disjoint image of said slideshow presentation is transparently displayed to the user as a plurality of substantially identical underlying video frames at an underlying pre-determined frame rate.

33. The system of claim 32, wherein the presentation manager is further configured to additionally incorporate advertising content in said video strip.

34. The system of claim 32, wherein the communications manager receives said request message over a network from a user of a personal communication device.

35. The system of claim 32, wherein the content manager is further configured to retrieve and aggregate targeted ads and/or sponsorships from advertisers.

* * * * *